July 23, 1940. J. VOTYPKA 2,208,712

VEHICLE BODY

Filed April 16, 1938 3 Sheets-Sheet 1

INVENTOR
John Votypka.
BY Dike Calver & Gray
ATTORNEYS.

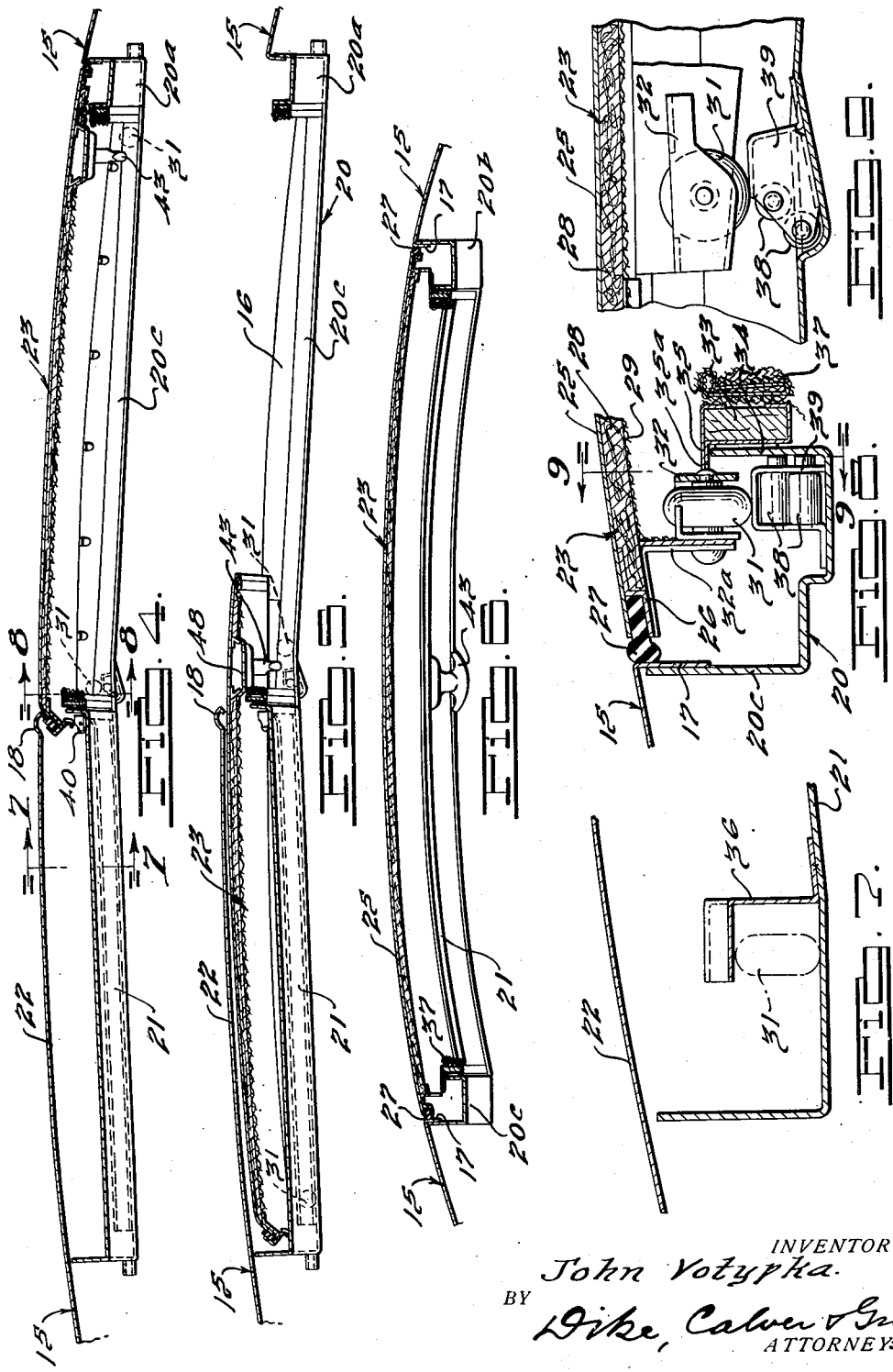

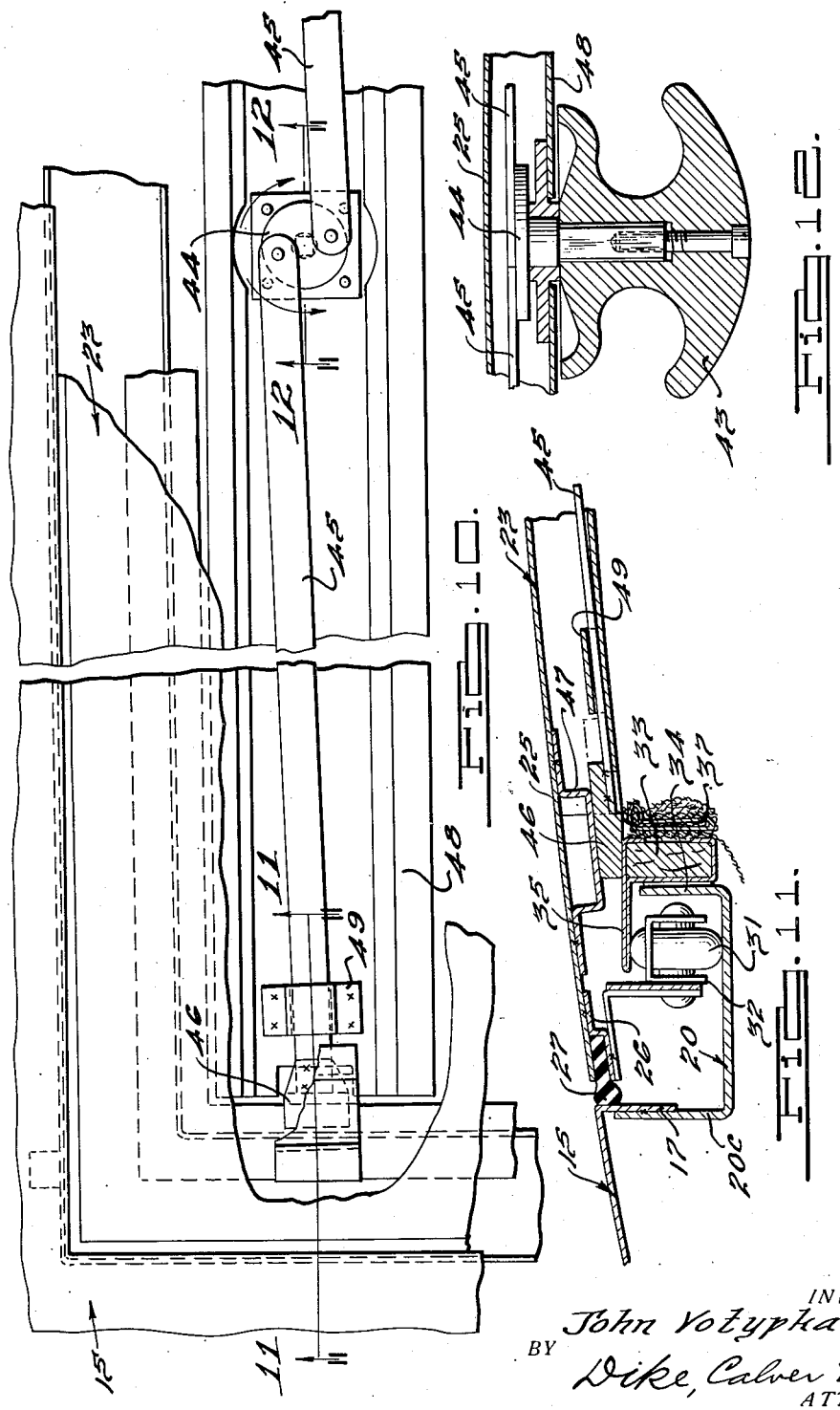

Patented July 23, 1940

2,208,712

UNITED STATES PATENT OFFICE 2,208,712

VEHICLE BODY

John Votypka, Detroit, Mich., assignor to Briggs Manufacturing Company, Detroit, Mich., a corporation of Michigan Application April 16, 1938, Serial No. 202,490

8 Claims. (Cl. 296—137)

This invention relates to vehicle bodies and more particularly, although not exclusively, to closed automobile bodies of the type having an opening in the roof thereof controlled by means of a movable roof panel.

One of the objects of the present invention is to provide a closed vehicle body having a roof with an opening therein and a longitudinally movable or adjustable roof panel supported, guided and controlled in an improved manner, whereby it is possible to attain in a closed vehicle body many advantages afforded by automobile bodies of the open type.

Another object of the invention is to provide a closed vehicle body with a sliding roof in which the roof structure presents a substantially smooth appearance closely approximating the appearance of all steel roofs of conventional automobile bodies, the improved construction being such that all protruding parts such as flanges, channels and the like are hidden in the structure proper.

A still further object of the invention is to provide a motor vehicle body having a curved roof structure covered with a metal sheet, and a sliding panel arranged in a skylight opening provided in said roof, the sliding panel being so constructed that the edges of the roof metal sheet and the edges of the sliding panel, when the same is closed, are substantially abutting, and the roof appears to be made of a single sheet interrupted only by the substantially unnoticeable dark line of the sealing means.

An additional object of the invention is to provide an improved vehicle body of the character specified, which is relatively simple in construction and dependable in operation, and which is relatively cheap to manufacture and service.

Other objects of this invention will appear in the following description and appended claims, reference being had to the accompanying drawings forming a part of this specification wherein like reference characters designate corresponding parts in the several views.

Fig. 4 is a longitudinal sectional view taken on the line 4—4 of Fig. 1 with the movable panel closed.

Fig. 5 is a view similar in part to Fig. 4, the movable panel being shown in its fully open position.

Fig. 6 is a transverse sectional view taken on the line 6—6 of Fig. 1.

Fig. 7 is a fragmentary sectional view taken on the line 7—7 of Fig. 4.

Fig. 8 is a fragmentary sectional view taken on the line 8—8 of Fig. 4.

Fig. 9 is a fragmentary sectional view taken on the line 9—9 on Fig. 8.

Fig. 10 is a plan view of the panel locking means, part of the panel and roof structure being broken away for the sake of clarity.

Fig. 11 is a transverse sectional view taken through the gutter member on the line 11—11 of Fig. 10.

Fig. 12 is a sectional view taken on the line 12—12 of Fig. 10.

Figure 1:
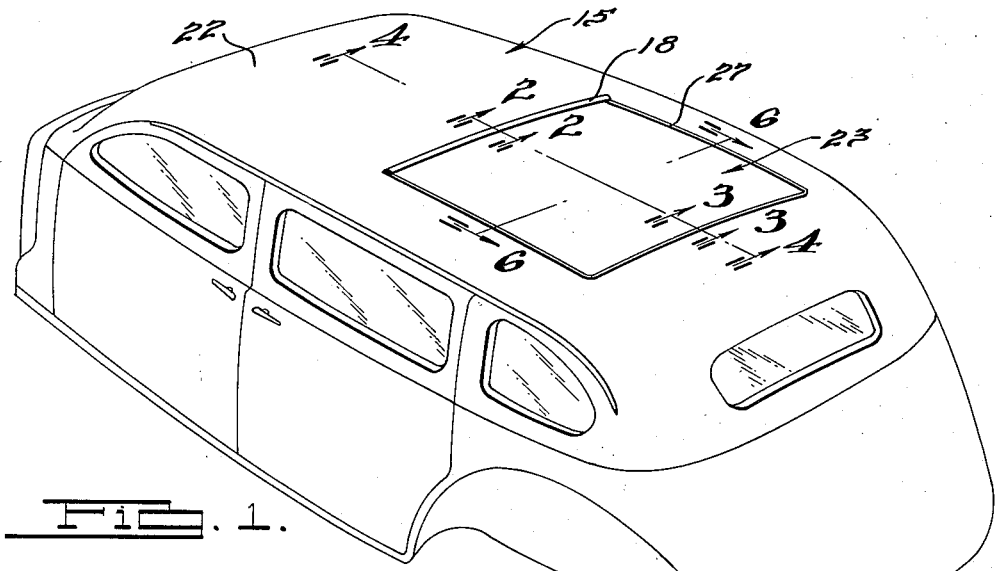
Fig. 1 is a perspective view of a vehicle body embodying the present invention, the sliding panel being shown in its closed position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain preferred embodiments of the invention as applied to an automobile body having a metal roof and an opening therein controlled by a movable non-transparent panel, said panel being movable toward the front of the vehicle for uncovering a roof opening located at the rear of the vehicle body. It will be understood, however, that the body may be constructed so that the movable panel will control an opening located at the front portion of the roof.

Referring to the drawings and particularly to Fig. 1, there is shown a vehicle body having a roof structure indicated generally by the numeral 15, which roof is suitably supported by the body frame structure (not shown), the cover sheets forming the outside surfaces of the roof 15 merging smoothly into the panels or sheets forming the top, front, the side and the rear panels of the body. The roof 15 is provided with a generally rectangular opening 16 extending substantially through the rear half of the roof structure. The opening or aperture 16 is intended to admit the sunshine and light at the top of the vehicle and, therefore, is hereinafter termed the "skylight" aperture or opening. The edges of the roof sheet at the sides and the rear of the aperture 16 are bent downward to form a depending flange 17, while the edge of said sheet at the front of the aperture 16 is provided with a raised bead 18 having a flange 19 extending downwardly and forwardly therefrom, see Fig. 2. To the flanges 17 there is secured a continuous channel shaped gutter member 20 consisting of rear portion 20a, and side portions 20b and 20c, the gutter merging at the front of the aperture into the sub-panel 21 arranged under the closed portion 22 of the roof structure. The sub-panel 21 and the closed portion 22 of the roof form a pocket 50 in front of the aperture into which a movable panel generally indicated by the numeral 23 many be manually moved for opening the skylight aperture 16, as is shown in Fig. 5. Moving of the panel 23 into position illustrated in Fig. 4 will close the aperture 16 converting the vehicle body into one of the closed type.

The movable panel 23 comprises an upper metal sheet 25 having a bent retainer strip 26 secured as by spot welding along its sides and the rear edge to hold firmly a resilient or elastic rubber sealing strip 27 adapted to bear against the flanges 17 and to exert a certain pressure thereon for effecting a substantially waterproof seal. Any small leakage which may occur past the strip 27 is collected in the channel shaped gutter member 20 and disposed outside of the vehicle with the aid of a suitable drain tube or pipe (not shown). A cardboard or fiberboard or a composition sheet 28 is provided underneath the top sheet 25 and it is secured thereto in any suitable manner. A suitable upholstery cloth 29 is provided underneath the cardboard sheet 28 in order to make the appearance of the lower surface of the movable panel correspond to that of the interior of the vehicle body.

Means guiding the movable panel 23 in its longitudinal path comprise tracks formed in the gutter members along the sides of the skylight aperture 16, said tracks continuing into the pocket 50 wherein they are formed along the sides of the sub-panel 21 as shown in Fig. 7. Upon said tracks on both sides of the movable panel run rollers 31 revolubly mounted in inverted U-shaped retainers 32 secured to the inner depending sides of angle brackets 32a secured to the movable panel along the sides thereof, see Figs. 8, 9 and 11.

One of the important advantages of the present invention follows from the fact that the means for retaining the movable panel in the tracks and preventing undesirable upward movements of the panel are entirely concealed within the body structure and are not noticeable from the inside of the vehicle. By virtue of such a construction a vehicle body embodying my invention presents little difference in appearance over conventional closed vehicle bodies, including those having the roof structures formed of continuous metal sheets shaped to give the desired curvature. In prior structures, however various expedients in the form of panels, rails, guard blocks, etc. protruding at the top of the vehicle have been resorted to, but the demand for smooth streamlined roof structures has rendered such prior constructions highly objectionable.

Another advantage of the present invention follows from the fact that it permits arrangement of the upper sheet 25 of the movable panel 23 substantially flush with the upper sheet of the roof structure, as may be clearly seen from an examination of the drawings, said sheets presenting a substantially continuous roof without objectionable light reflections which may result if a straight panel is provided as an insert in the crown of the roof, which light reflections immediately betray the articulated construction of the roof. My new body appears to have a smooth metal roof interrupted only by a somewhat darker line of the rubber sealing strip 27 and the bead 18, see Fig. 1.

The movable panel 23 is retained in place by means of a metal channel 33, see Fig. 11, housing a wood tacking strip 33a and secured to the inner upstanding flange 34 of the longitudinal gutter member 20. The channel shaped metal retainer strip 33 is provided with an outwardly extending resilient flange 35 overlying the rollers 31 and holding the same down to the track. Thus, the rollers 31 run between the tracks formed by the base of the gutter members 20 and the flanges 35 of the retainer strips 33. The retainer strips are secured to the walls 34 of the gutter members with the aid of screws passing through vertical slots in the tacking strips and inner webs of the channels 33 which permit slight vertical adjustment thereof to ensure the desired pressure of the flanges 35 on the rollers 31. The pressure of the retainer strips on the rollers 31 is very light and, in fact, there may be a small clearance space between them, in order to prevent interference with the movements of the rollers or excessive friction. Such screws are hidden with the aid of the so-called wire-on-binding or trim strip 37. In the pocket formed by the sub-panel 21 the retaining of the rollers is effected by means of double angle brackets 36 having flanges 36a overlying the rollers, see Fig. 7.

Figure 2:
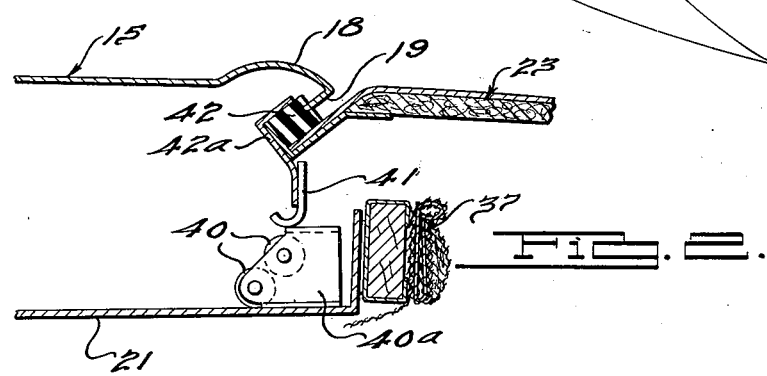
Fig. 2 is a sectional view taken on the line 2—2 of Fig. 1, looking in the direction of the arrows.
Figure 3:
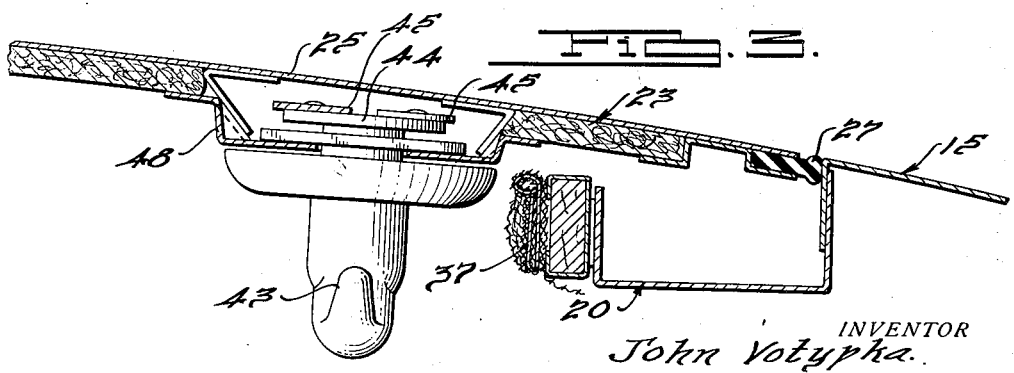
Fig. 3 is a sectional view taken on the line 3—3 of Fig. 1, looking in the direction of the arrows.

In order to permit the movable panel to slide into the pocket, its front edge must be lowered for a certain distance to provide sufficient clearance between the top sheet 22 of the roof and the panel 23. It is also important to provide means whereby at the end of the closing movement of the panel 23 its front edge is raised up and pressed against the edge of the sheet 22 to effect the desired seal. In the present embodiment, such means comprise a plurality of sets of rollers 38 arranged adjacent opposite sides of panel 23, each set in the present instance comprising two rollers rotatably mounted in vertically stepped arrangement in a bracket 39 (Fig. 9) provided in the tracks substantially under the bead 18. An additional pair of rollers indicated at 40 in Fig. 2 is provided in the middle of the rear edge of the sub-panel 21, this set being journaled in stepped arrangement in a bracket 40a similar to bracket 39. The forward edge of the panel 23 (Fig. 2) is inclined downwardly and formed with a channel structure 42a providing an open groove to receive an elastic compressible rubber strip 42. Depending from the channel 42a is a shoe or runner 41 having a curved bottom edge positioned to engage the rollers 40.

When the front rollers 31 engage the rollers 38, and the shoe 41 at the same time engages the intermediate set of rollers 40, further continued rearward movement of the panel 23 will cause the front end of the movable panel to rise in the direction determined by the stepped positions of the rollers 38 and 40. Elevation of the front end of the sliding roof panel causes the rubber sealing strip 42 to be pressed against the edge of the flange 19 which will embed sufficiently therein to ensure provision of a perfect water seal. It should be noted that the retainer flange 35 on the channel strip 33 is cut away under the bead 18 as indicated at 35a in Fig. 8 to permit rising of the rollers above said strips. Movement of the panel forward to open the roof will cause the rollers 31 and shoe 41 to ride down over the rollers 38 and 40 thereby dropping the sliding panel below the fixed roof panel 22 and permitting free forward movement of the sliding panel to the open position shown in Fig. 5.

Movements of the panel 23 may be effected manually and a suitable handle may be provided at the rear end thereof. In the present embodiment a handle 43 enables manual movement of the panel as well as the operation of the locking means, whereby the panel may be securely locked at any desired point along its path of travel.

The locking means are mounted substantially within the movable panel, and they commprise a crank disk 44, operable by the handle 43, to which there are hinged bars 45 at the outward ends of which are provided friction wedges 46 adapted to be pushed into the clearance spaces between channel shaped bearing pieces or strips 47 secured to the upper sheet 25 of the panel 23 and the top surfaces of the channel strips 33, see Figs. 10 and 11. From an examination of Fig. 10 it can be easily understood that when the crank is rotated in the clockwise direction, the wedges 46 at opposite sides of the sliding panel will be withdrawn from said clearance spaces releasing the movable panel 23 for free movement, while rotation of said crank in the counterclockwise direction will shift the bars 45 endwise and outwardly, pushing the wedges into the clearance spaces for locking the sliding panel. The locking mechanism including handle 43 is supported by a hollow plate or bracket 48 extending transversely of the sliding panel 43 along the underside thereof and providing a housing as well as a support for the locking bars. 45. Adjacent opposite ends of the supporting member or bracket 48 are guide straps 49 (Figs. 10 and 11) for guiding and locating the locking bars. It will be seen that movement of the wedges 46 into locking positions will also frictionally bind the rollers 31 against movement between the retainer flanges 35 and the base of the gutter members.

I claim:

1. In a vehicle body, a roof structure having a skylight aperture therein, a pocket adjacent said aperture, a panel movable into and out of said pocket to open and to close said aperture, a track provided along each side of said aperture and pocket, rollers on said panel adapted to run in said tracks, a finish strip secured to said roof structure, a flange on said strip overlying the rollers and holding the panel down, a locking mechanism including a wedge member adapted to be pushed between said strip and the movable panel for locking the panel in a desired position.

2. In a vehicle body, a roof structure having a skylight aperture therein, a pocket adjacent said aperture, a panel movable into and out of said pocket to open and to close said aperture, a gutter member at each side of said roof structure along said aperture and pocket, a track on each of said members, rollers on said panel adapted to travel on said tracks, a finish strip on each of said gutter members, flanges on said strip extending over said rollers and holding the same down, locking mechanism including a wedge member adapted to be thrust between said finish strip and the movable panel for locking the panel in a desired position.

3. In a vehicle body, a roof structure having a skylight aperture therein, a pocket adjacent said aperture, a panel movable into and out of said pocket to open and to close said aperture, a gutter member at each side of said roof structure along said aperture and pocket, a track on each of said members, rollers on said panel adapted to travel on said tracks, a finish strip on each of said gutter members, flanges on said strip extending over said rollers and holding the same down thereby retaining the roof, a locking mechanism mounted on the sliding panel and including two wedges adapted to be spread and thrust into the clearance space between the finish strip and movable panel to lock frictionally the panel in different positions along its path of travel.

4. In a vehicle body, a roof structure having a skylight aperture therein, a pocket adjacent said aperture, a panel movable into and out of said pocket to open and to close said aperture, a gutter member at each side of said roof structure along said aperture and pocket, a track on each of said members, rollers on said panel adapted to travel on said tracks, a finish strip on each of said gutter members, flanges on said strip extending over said rollers and holding the same down thereby retaining the roof; locking mechanism mounted within the sliding panel and comprising a crank, two bars hinged thereon, a handle for operating the crank, said bars being adapted to be spread outward as the crank is rotated, and a friction wedge on the end of each bar adapted to be thrust into the clearance space between the strip and the movable panel in order to lock the panel frictionally at different points along its path of travel.

5. In a vehicle body, a roof structure having a skylight aperture therein, a pocket adjacent said aperture, a panel movable into and out of said pocket to open and to close said aperture, said panel including a top sheet, retainer means extending along three sides of the sheet therebeneath, resilient sealing means secured between said sheet and said retainer means, and a roller carried by said retainer means.

6. In a vehicle body, a roof structure having a skylight aperture therein, a pocket adjacent said aperture, the edges of the roof along the three sides of the aperture being turned downward to form a continuous depending flange, a gutter member secured to said depending flange and said pocket, tracks formed in said gutter members and continuing into said pocket, a panel movable into and out of said pocket to open and to close said aperture, said panel including a top sheet, a bent strip secured to the edge of said sheet around the three sides thereof, a resilient strip firmly held between said sheet and said strip and extending outwardly to bear against said depending flange when the aperture is closed.

7. In a vehicle body, a roof structure having a skylight aperture therein, a pocket adjacent said aperture, the edges of the roof along the three sides of the aperture being turned downward to form a continuous depending flange, a gutter member secured to said depending flange and said pocket, tracks formed in said gutter members and continuing in said pocket, a panel movable into and out of said pocket to open and to close said aperture, said panel including a top sheet, a bent strip secured to the edge of said sheet around the three sides thereof, a resilient strip firmly held between said sheet and said strip and extending outwardly to bear against said depending flange when the aperture is closed, an angle strip secured to said bent strip, and a roller carried by said angle strip and adapted to run in said track.

8. In a vehicle body, a roof structure having a skylight aperture therein, a pocket adjacent said aperture, the edges of the roof along the three sides of the aperture being turned downward to form a continuous depending flange, a gutter member secured to said depending flange and said pocket, tracks formed in said gutter members and continuing in said pocket, a panel movable into and out of said pocket to open and to close said aperture, said panel including a top sheet, a bent strip secured to the edge of said sheet around the three sides thereof, a resilient strip firmly held between said sheet and said strip and extending outwardly to bear against said depending flange when the aperture is closed, an angle strip secured to said bent strip, a roller carried by said angle strip and adapted to run in said track, a finish strip secured to said gutter member, and a flange on said finish strip overlying said roller and adapted to hold the same as well as the movable panel down.

JOHN VOTYPKA.